United States Patent [19]
Izawa et al.

[11] Patent Number: 6,122,435
[45] Date of Patent: Sep. 19, 2000

[54] DIGITAL RECORDING AND PLAYBACK UNIT WITH AN ERROR CORRECTION DEVICE

[75] Inventors: Masato Izawa, Neyagawa; Hiroshi Horikane, Kadoma, both of Japan

[73] Assignee: Matsushita Electric Industrial Co., Ltd., Japan

[21] Appl. No.: 08/915,728

[22] Filed: Aug. 21, 1997

[30] Foreign Application Priority Data

Aug. 22, 1996 [JP] Japan .................................. 8-220909

[51] Int. Cl.[7] .................................................. H04N 5/76
[52] U.S. Cl. .............................. 386/95; 386/116; 386/124
[58] Field of Search ............................ 386/46, 112, 109, 386/95, 47, 55, 65, 66, 124, 116; H04N 5/76

[56] References Cited

U.S. PATENT DOCUMENTS

| | | | |
|---|---|---|---|
| 4,318,143 | 3/1982 | Kubota et al. ............................. | 386/72 |
| 5,483,389 | 1/1996 | Karasawa ................................. | 360/53 |
| 5,583,654 | 12/1996 | Oguro ..................................... | 386/96 |
| 5,745,318 | 4/1998 | Kubota et al. ............................. | 386/46 |

FOREIGN PATENT DOCUMENTS 0 556 816 A2  8/1993  European Pat. Off. .

OTHER PUBLICATIONS

Patent Abstracts of Japan; vol. 10, No. 141 (E–406) 2198!; May 24, 1986 & JP 61 003584 A (Matsushita Denki Sangyo K.K.); Jan. 9, 1986 *the whole document*.

*Primary Examiner*—Huy Nguyen
*Attorney, Agent, or Firm*—Parkhurst & Wendel, L.L.P.

[57] ABSTRACT

A digital recording and playback unit which prevents deterioration of reproduced video image due to confusion in servo control occurring at a chronologically discontinued portion in the recording at the time of playback when a wide head is used for reproducing assembled video data recorded in a narrow track width. The digital recording and playback unit include a decoding circuit for decoding the reproducing signal to digital playback data, an error correction circuit for restoring erroneous portions of the data decoded by the decoding circuit, a first frame memory used for making corrections by the error correction circuit, a deshuffling circuit for reassembling data restored by the error correction circuit, a second frame memory used for deshuffling by the deshuffling circuit, a detecting circuit for detecting a chronologically discontinued portion in the recording at the time of playback, and a control circuit for instructing writing and reading to and from the first and second frame memories based on the output of the detecting circuit. Helical scanning is employed and one frame of the video image consisting of multiple tracks is recorded in a track width of 2 W/3, where W is the width of a recording and playback head.

18 Claims, 11 Drawing Sheets

FIG. 7D 10 tracks/1 frame (525/60)

DIGITAL RECORDING AND PLAYBACK UNIT WITH AN ERROR CORRECTION DEVICE

FIELD OF THE INVENTION

The present invention relates to the field of digital recording and playback units which record and play back video signals using digital signals and, more particularly, to assemble recording in digital video tape recorders.

BACKGROUND OF THE INVENTION

An increasing proportion of equipment is becoming digitized, and digital video cassette recorders (hereafter referred to as VCRs) adopting the digital (DV) format have been commercialized.

A digital VCR with DV format of the prior art is explained below according to the document "Specifications of Consumer-Use Digital VCRs using 6.3 mm magnetic tape" published in December, 1994 by HD DIGITAL VCR CONFERENCE.

The DV format can roughly be classified into the standard definition (SD) standard for recording standard television signals and the high definition (HD) standard for recording high definition signals.

Figure 5:
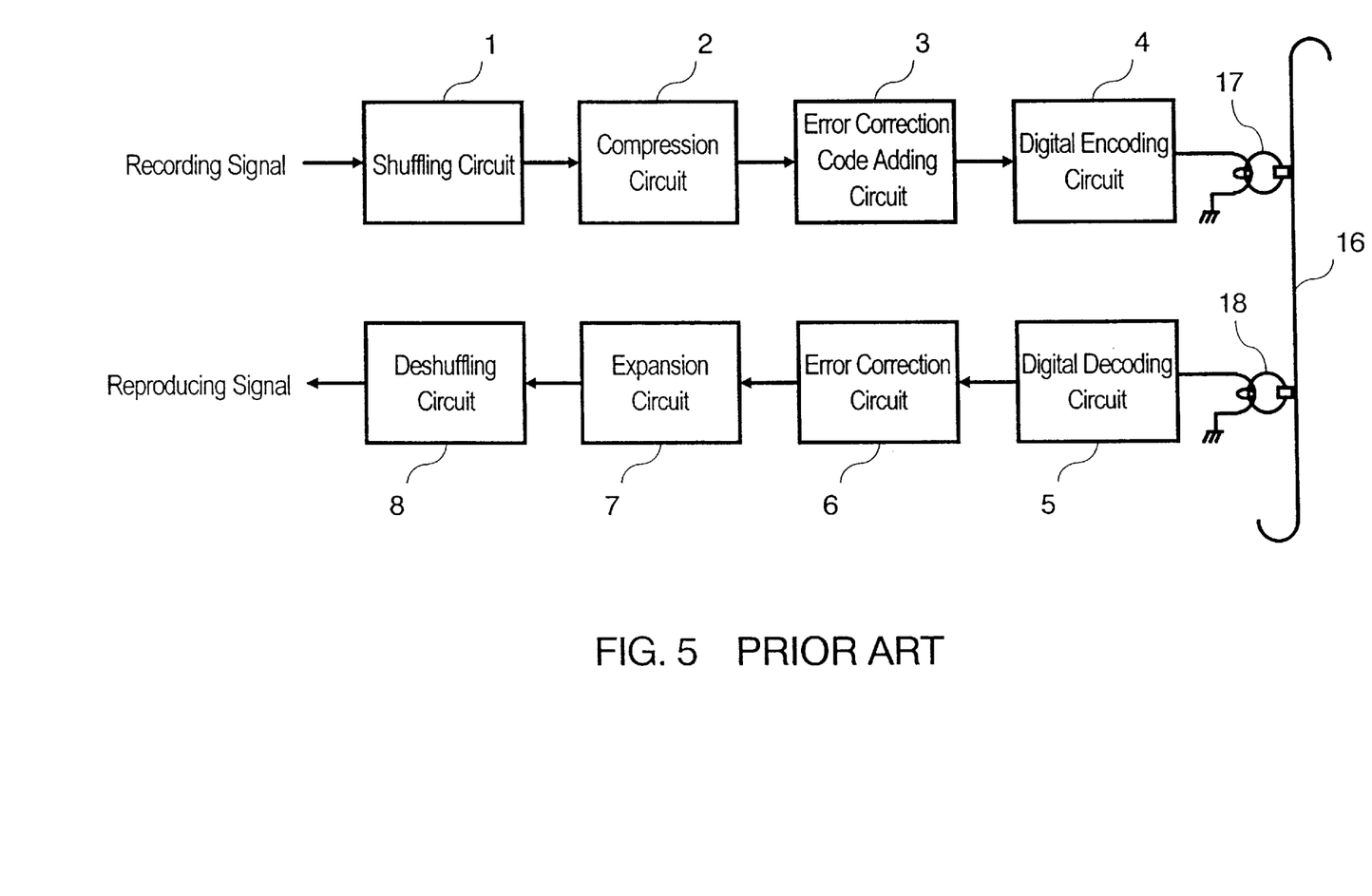
FIG. 5 is a block diagram of a digital recording and playback unit in accordance with the prior art.

FIG. 5 is a block diagram illustrating an example of how conventional digital recording and playback units process video signals in accordance with the SD standard. A shuffling circuit 1 changes the order of video data to average frame data and increase compression efficiency within each frame. A compression circuit 2 compresses the video image, and an error correction code adding circuit 3 adds the error correction signal to the signal compressed by the compression circuit 2. A recording head 17 records the output signal of a digital encoding circuit 4 onto a tape 16. A playback head 18 reproduces the signals recorded on the tape 16, a digital decoding circuit 5 decodes the signals reproduced by the playback head 18, and an error correction circuit 6 corrects data when errors exist. An expansion circuit 7 expands the compressed data to its original size, and a deshuffling circuit 8 reassembles the video data in its original order.

Operation of the conventional digital recording and playback unit as configured above is explained next.

First, the operation by which video data is recorded onto a tape is explained.

The luminance signal constituent of the video signal is sampled and quantized into 8-bit 13.5 MHz form and the color difference signal into 8-bit 6.75 MHz form to generate video data. The shuffling circuit 1 changes the order of the video data, which is recorded data, to average the frame data of the video image for increasing the compression efficiency within the frame. The compression circuit 2 then compresses the shuffled video data to one fifth of its original volume. The error correction code adding circuit 3 adds error correction codes to the compressed video data, and the digital encoding circuit 4 encodes the compressed video data and then sends it to the recording head 17 for recording the data onto the tape 16.

Next, the method by which recorded video data is reproduced from the recorded tape is explained.

The playback head 18 reproduces signals from the tape 16, and the digital decoding circuit 5 decodes these signals. The error correction circuit 6 corrects errors occurring in the data, and the expansion circuit 7 expands the compressed data to its original volume. Finally, the deshuffling circuit 8 reassembles the video data in its original order and the reproducing signals are output.

Figure 6:
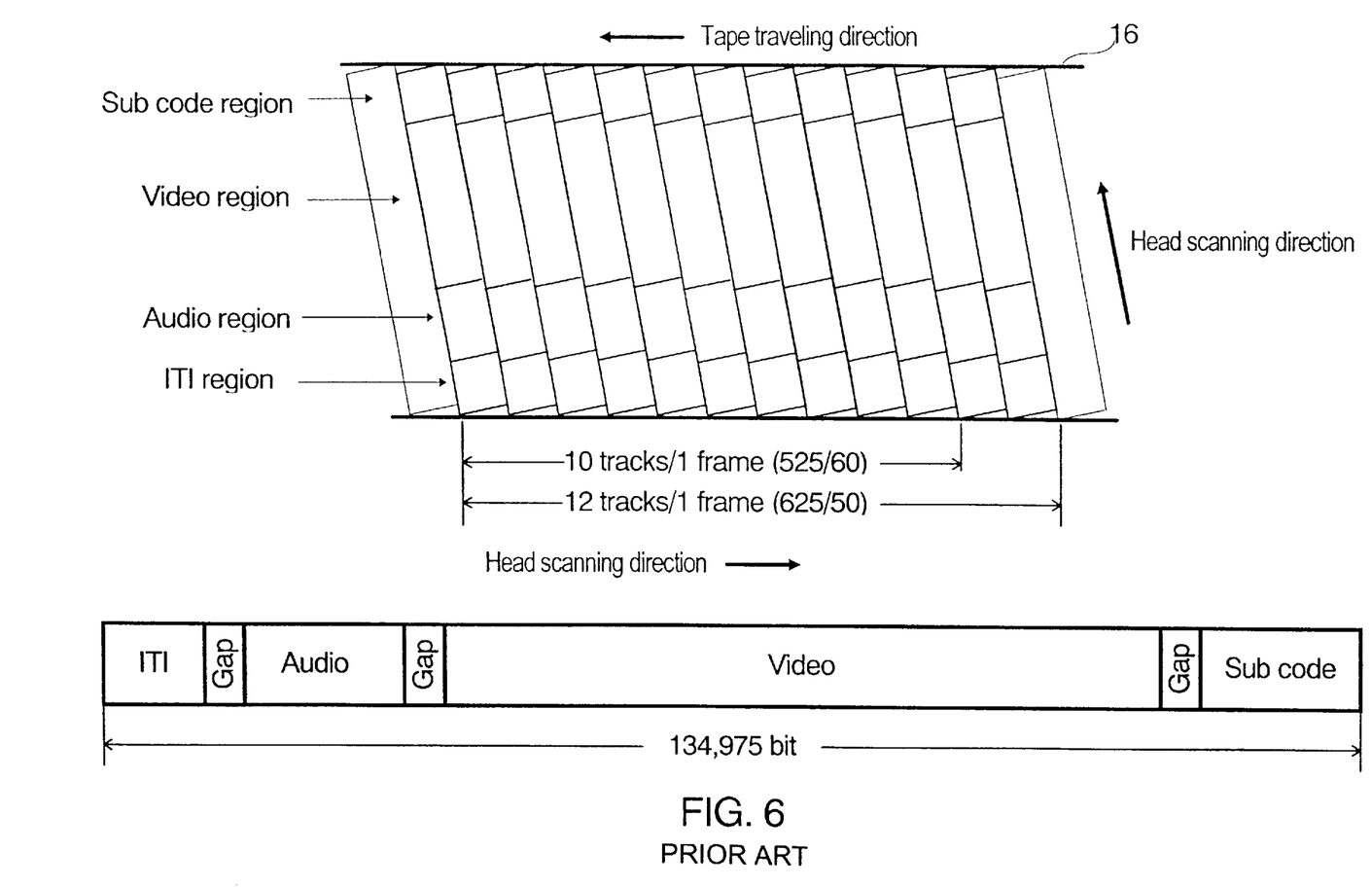
FIG. 6 is an example of a tape format of a digital recording and playback unit.

FIG. 6 shows a format of the tape 16 on which data is recorded. The prior art employs the azimuth recording system using a rotary head. A recording track width is 10 $\mu$m and the minimum recording wavelength is 0.49 $\mu$m, which is the very high recording density currently used in commercialized VCRs. Data for one frame is recorded onto 10 tracks in the NTSC system, and 12 tracks in the PAL system. The tracks on the tape are roughly divided into four regions from the bottom: the insert track information (hereafter referred to as ITI) region, the audio region, the video region, and the subcode region.

The ITI region holds information for regulating the position of each region when inserting data, on the data structure in each track, and for identifying the track pitch. The audio region holds audio data and its auxiliary information (hereafter referred to as audio AUX), and the video region holds video data and its auxiliary information (hereafter referred to as video AUX). The subcode region typically holds three types of search signals, including the time code which indicates recording hours, absolute track number which indicates the absolute address, and information on recording date and time. Other optional information whose use is designated by the manufacturer may be stored in the subcode region.

The automated track finding system (hereinafter referred to as ATF) is employed for controlling track scanning, and a specified tracking pilot signal is generated in the data when the data is digitally encoded as described above.

Figures 7A, 7B, 7C:
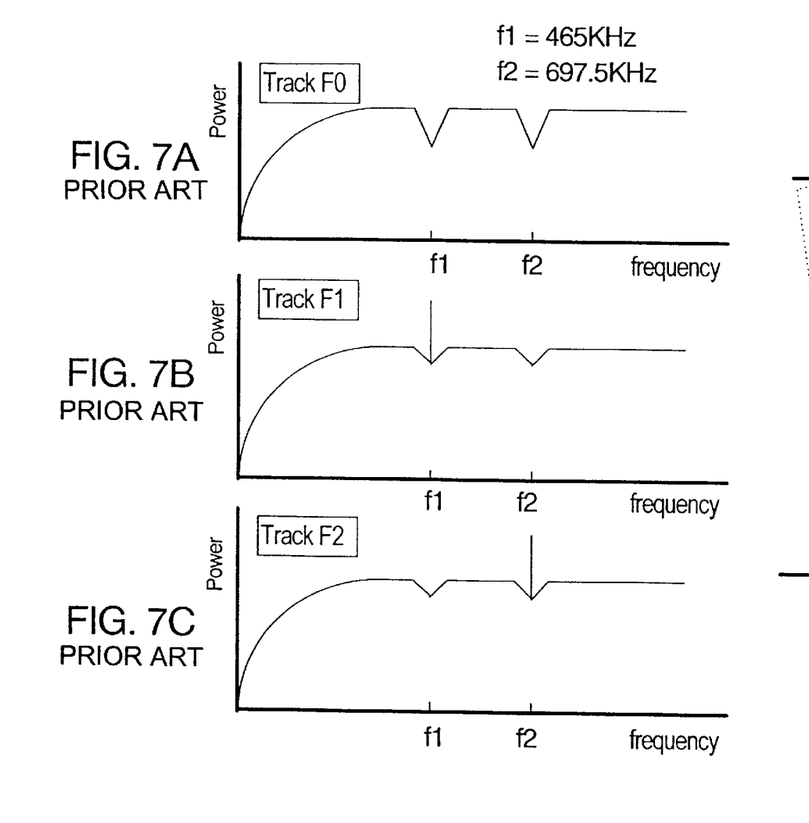
FIGS. 7A–7D illustrate ATF control of a digital recording and playback unit.
Figure 7D:
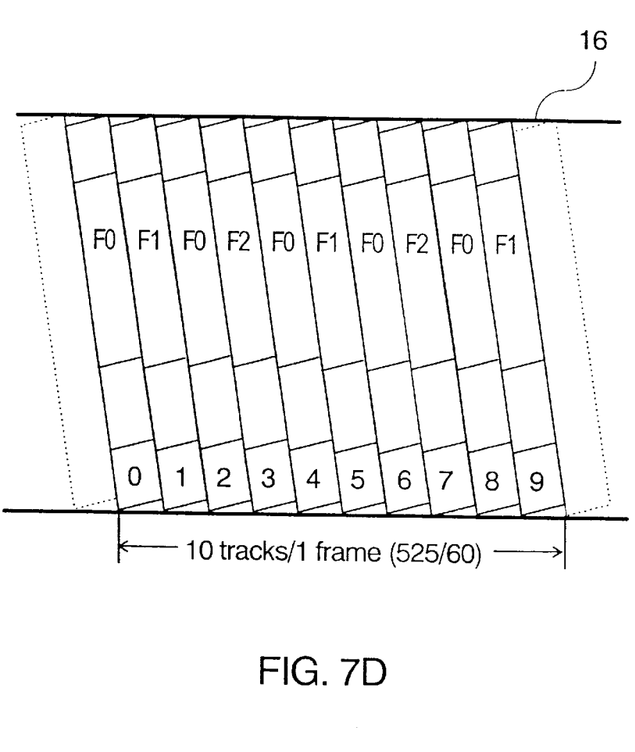

FIGS. 7A to 7D illustrate how the ATF system works. Three types of frequency spectrum, as shown in FIGS. 7A to 7C, are available depending on the recording track, and an appropriate frequency spectrum is selected according to the track. The three types of frequency spectrum are called, respectively, track F0 for the type in FIG. 7A, track F1 for FIG. 7B, and track F2 for FIG. 7C. No pilot signal is generated in track F0. The pilot signal, defined as the pilot frequency f1=465 kHz for track F1 and f2=697.5 kHz for track F2, is generated in tracks F1 and F2. Three types of recording tracks are repeated in the order of F0, F1 and F0, F2 as shown in FIG. 7D. During playback, the head detects a component of the pilot signal f1 and f2 leaked from the adjacent tracks F1 and F2 as the head traces the track F0. Tracking control, to assure accurate tracing of recorded tracks, is realized by adjusting the position of the head to maintain the leaked pilot signal at a certain level.

The recording medium has a width of ¼ inch (6.35 mm). The prior art adopts a two cassette system, consisting of small and standard cassette tapes. The size of the small cassette tape as compared to the existing analog VCR cassette is a mere ½ of that of an 8 mm VCR cassette and ⅓ that of a VHS-C cassette. The standard cassette is ⅓.₅ of a standard VHS cassette. Standard television signals are recordable for 1 hour on a small cassette and 4.5 hours on a standard cassette. Since the DV format is a new format, it naturally is designed to be smaller than the present analog VCR cassette. However, due to limited capacity, there still exist a series of difficulties in achieving recording hours equivalent to that of analog VCR cassettes, since digitized video data, in spite of being compressed, take up proportionally more recording space than analog data.

To improve the performance of VCR cassettes in terms of recording hours, measures for (1) further improving recording density, (2) increasing the compression rate to reduce information volume, and (3) making the recording medium thinner to increase the recording area per cassette are being studied. In the DV format specifications, the basic direction for realizing longer recording hours has already been determined as additional specifications published in January, 1996.

To improve recording density, the DV format adopts the narrow track system to further narrow the present track width of 10 μm, following the same principle as the super long play (SLP) mode of the VHS system. The narrower recording track width is 6.67 μm, ⅔ of the standard track width of 10 μm.

In a system which records and plays back video images using a common head for standard track and narrow track widths, the common head records and plays back the image without providing a guard band to obtain a complete reproducing signal in the standard track width. In addition, the width of the common head may be required to be wider than the standard track, i.e. wider than 10 μm, to detect the ATF pilot signal from adjacent tracks as mentioned previously.

Figure 8A:
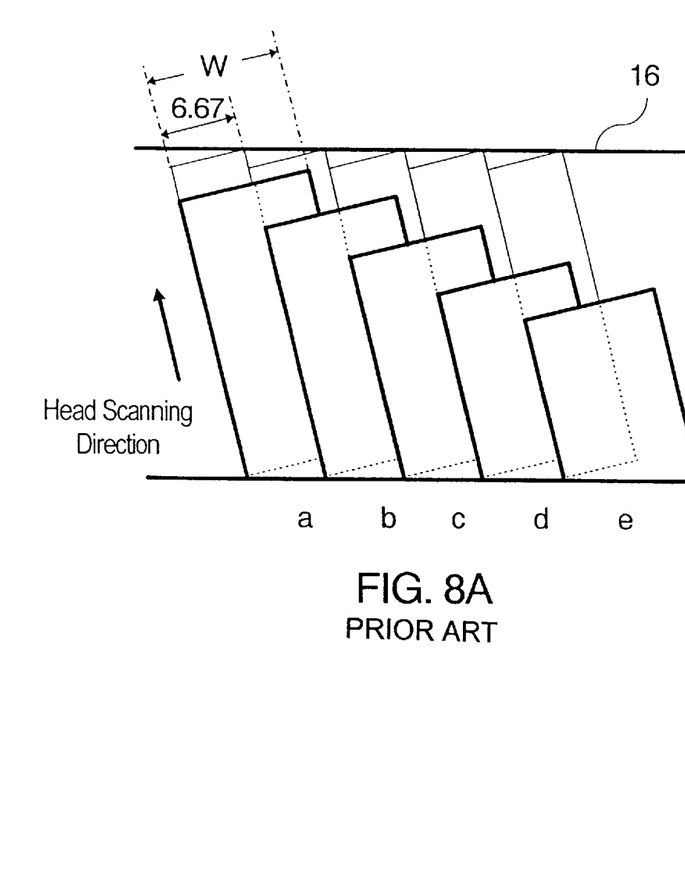
FIGS. 8A–8B are examples of a tape at recording and playback, respectively, in a narrow track width using a wide head.
Figure 8B:
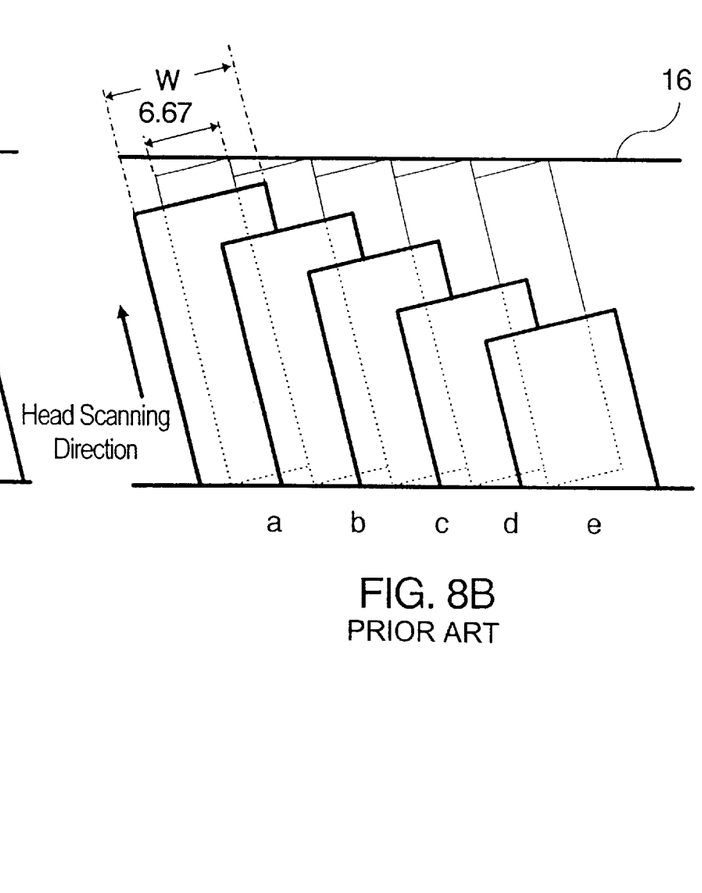

FIGS. 8A and 8B illustrate the recording and playback operation when a head wider than 10 μm is used for recording and playing back in narrow tracks. The thin solid lines on a recording tape 16 illustrate a recording track pattern for narrow track recording and the bold lines illustrate the scanning trace of the head. The head scans in the order of a, b, c, d, and e. During recording, the head overwrites data with reference to the lower end of the head as shown in FIG. 8A. During playback, the head traces the recorded tracks on its center, maintaining an equal overlapping area with adjacent tracks on both sides, by the aforementioned ATF control as shown in FIG. 8B.

Figure 9A:
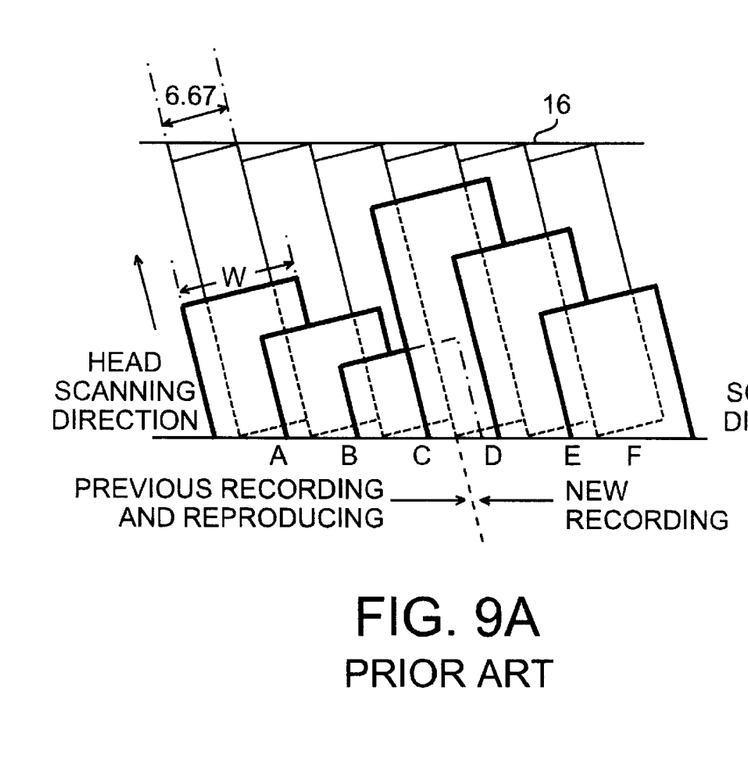
FIGS. 9A–9B are examples of a tape at assemble recording and playback, respectively, in a narrow track width using a wide head.
Figure 9B:
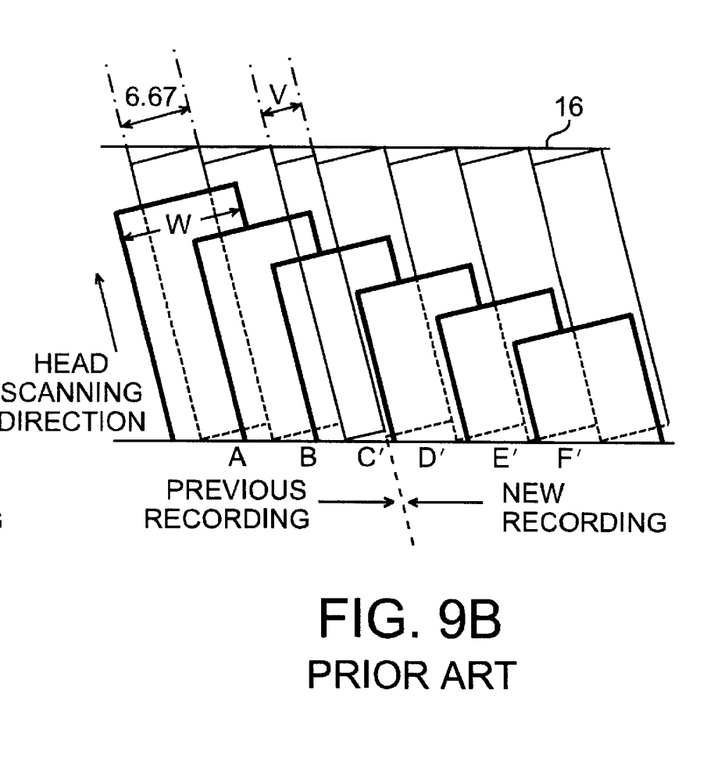

FIGS. 9A and 9B illustrate the recording and playing back operation during assemble recording in narrow tracks. The thin solid lines in FIG. 9A show that the new video image is recorded in narrow tracks over the video image already recorded on the tape in narrow tracks. On starting assemble recording, the digital recording and playback unit of the prior art rewinds the recorded tape for a certain length and operates a short playback to adjust framing to 10 tracks/frame and to obtain information on the previous recording including the time code. At this point the ATF control is applied to the head to trace tracks A, B, and C of the previous recording on its center in the playback mode. On starting new recording, the head overwrites the tape with new recording tracks such as D, E, and F with reference to the lower end of the tracks. On this starting of assemble recording, a part of the last track of the last frame of the previous recording is overwritten by the first track of the new recording as shown by track C in FIG. 9A and causes narrowing of that track as shown by track C' in FIG. 9B. If a narrowed track exists, the level of leaked pilot signal used for ATF control cannot be maintained at a certain level. In other words, the level of the pilot signal leaked from adjacent tracks changes suddenly from track D' of the newly recorded portion when playing back through the previously recorded portion and the new recording portion. This causes uncontrolled tracking for a certain period of time until the level is stabilized. When the ATF system controls the head to trace the track of the old recording on its center, where V is the width of track C' and W is the head width, V is calculated as follows:

V=(6.67×3−W)/2

V: Width of narrowed track (μm)

W: Head width (μm)

If the head width W is at least wider than 10 μm, the width V of track C' becomes narrower than 5 μm. In other words, increased head width further narrows track C', resulting in a greater transition effect between the old recording and the new recording.

Figure 10:
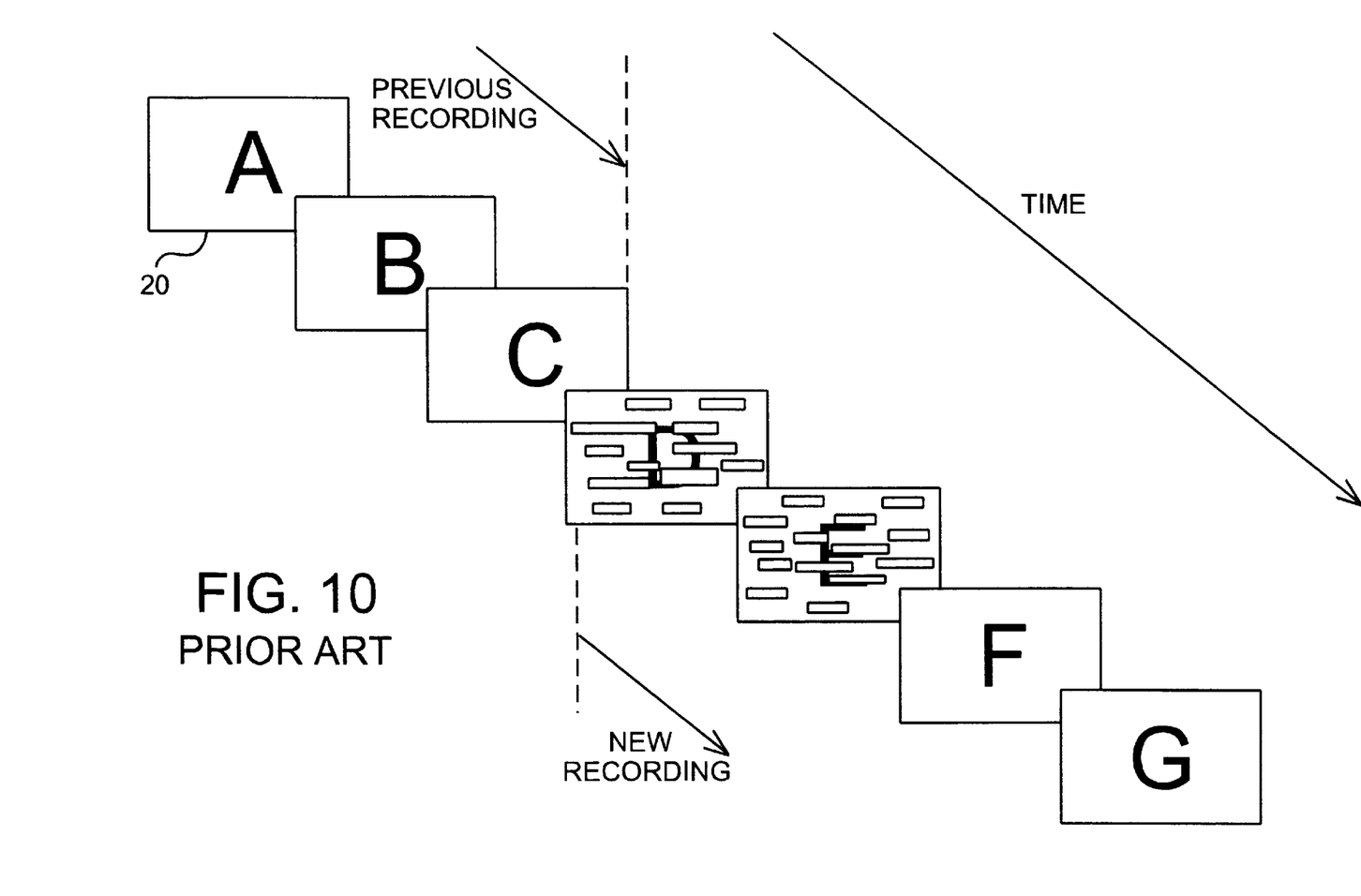
FIG. 10 is an example of reproduced video image in a digital recording and playback unit in accordance with the prior art.

FIG. 10 shows video images of assemble recording in narrow tracks displayed when the video image is played back in the normal mode of the conventional digital VCR. A frame image 20 is the image reproduced and displayed, and it is renewed in the sequence of A, B, C, D, E, F, and G as time passes. When deviation in ATF control occurs at the joint portion, video data is not accurately reproduced for a few frames in the new recording after the joint portion as shown in FIG. 10 because of uncorrectable errors occurring in the data for playing back the video image. An image deviating significantly from the ideal may be displayed in frames D and E.

As mentioned above, sudden confusion in ATF control when playing back in the normal mode has a significant and deleterious effect on reproduction of video image data for a few frames in the new recording at a joint portion of assemble recording. The recorded image may not be reproducible and causes interruption in the reproduced image.

SUMMARY OF THE INVENTION

The present invention offers a digital recording and playback unit which prevents deterioration of reproduced video image due to confusion in servo control occurring at a chronologically discontinued portion in recording at the time of playback when a wide head is used for reproducing assembled video data recorded in narrow track width.

The digital recording and playback unit of the present invention comprises a decoding circuit for decoding the playback signal to digital playback data, an error correction circuit for restoring erroneous part of the playback data from the decoding circuit, a first frame memory used for making corrections by the error correction circuit, a deshuffling circuit for reassembling data restored by the error correction circuit, a second frame memory used for deshuffling by the error correction circuit, a detecting circuit for detecting a chronologically discontinued portion in recording at the time of playback, and a control circuit for instructing writing and reading to and from the first and second frame memories based on the output of the detecting circuit. The present invention employs helical scanning, records video images in a track width of 2 W/3, where W is the width of a recording and playback head, and forms one frame of the video image by multiple tracks.

With the above configuration, the present invention detects a chronologically discontinued portion in recording at the time of playback in the normal mode as a joint portion, and eliminates interruption in reproduced video image for assuring the video quality by retaining an image of the old recording in the frame memory of the reproduction process, utilizing the time difference from a reproduction process to display video data, while the ATF control is confused in a new recording portion.

DESCRIPTION OF THE PREFERRED EMBODIMENTS

First exemplary embodiment

Figure 1A:
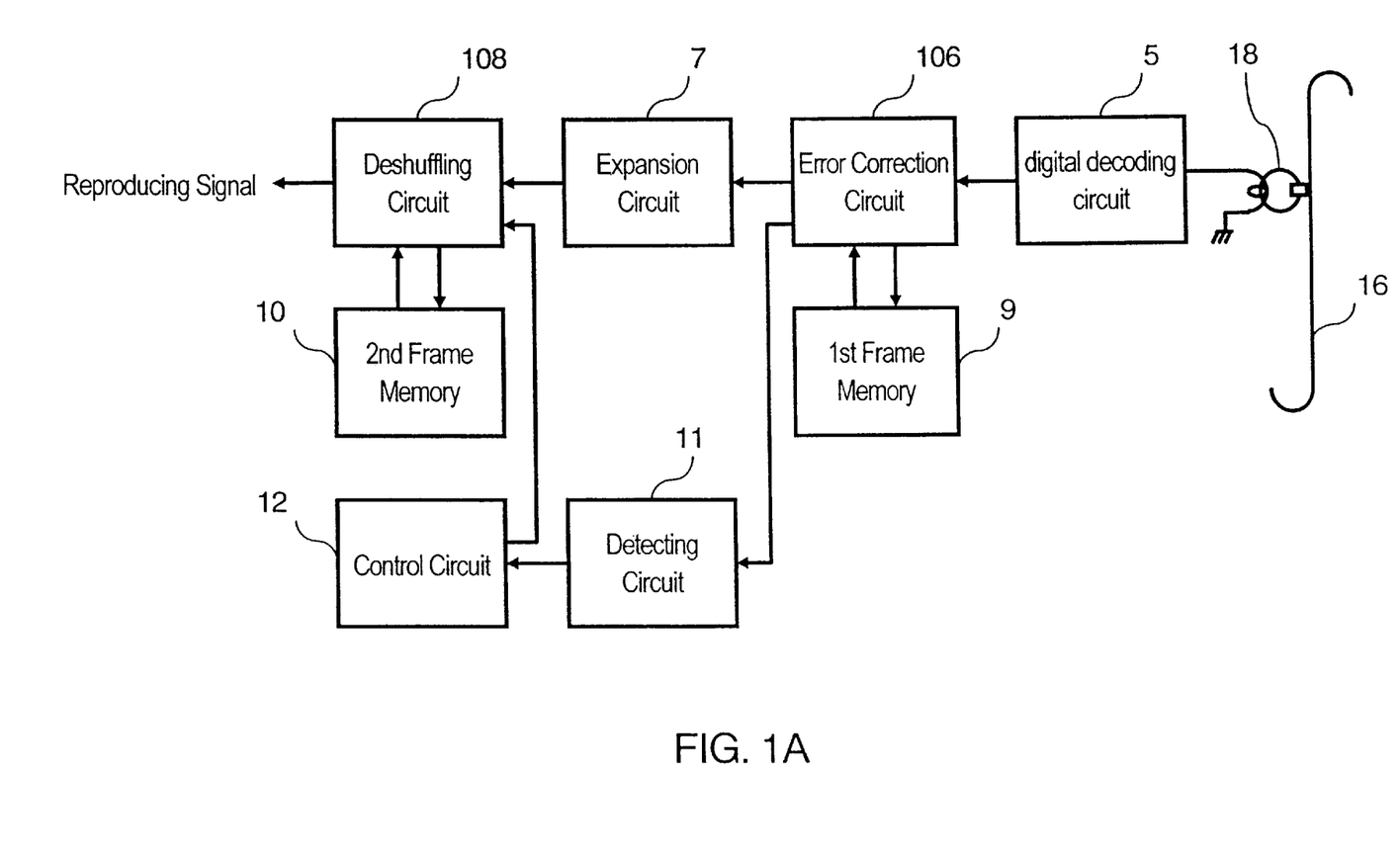
FIG. 1A is a block diagram of a reproduction system of a digital recording and playback unit in accordance with a first exemplary embodiment of the present invention.

FIG. 1A is a block diagram of a reproduction system of a digital recording and playback unit according to a first exemplary embodiment of the present invention.

The basic operation is the same as that of the prior art. Signals reproduced from a tape 16 by a playback head 18 are decoded by a digital decoding circuit 5. Then errors in the data are corrected by an error correction circuit 106. An expansion circuit 7 expands compressed data to its original size, and a deshuffling circuit 108 reassembles the data to its original order and outputs as reproducing signals.

A detecting circuit 11 detects a chronologically discontinued recorded portion from reproduced video data restored by an error correction circuit 106, and outputs the detection signal to a control circuit 12. A second frame memory 10 is a buffer memory for deshuffling and reassembling the video data, which a shuffling circuit 1 (refer to FIGS. 3 and 5) has shuffled during recording, to the original order. The control circuit 12 controls the reading and writing of video data between the deshuffling circuit 108 and the second frame memory 10 based on the detection signal from the detecting circuit 11. A first memory 9 is a buffer memory for calculation using the error correction circuit 106 for restoring data based on the error correction code if it is added to the data during recording.

Operation of a digital recording and playback unit of the first exemplary embodiment as configured above is explained below. Data reproduced from a tape 16 is decoded by the digital decoding circuit 5 and existing errors in data are restored by the error correction circuit 106. The Reed-Solomon code is employed as error correction code added at the time of recording, and the error correction circuit 106 restores data by decoding the outer and inner error correction codes. Since data is not restorable in real time, a memory may be required for this process. Therefore, the error correction circuit 106 employs the first frame memory 9 for restoring data. An expansion circuit 7 expands the compressed restored data to reconstitute the original video data. The data restored by the error correction circuit 106 is also sent to the detecting circuit 11 for detecting a chronologically discontinued portion. The deshuffling circuit 108 finally reassembles the data expanded by the expansion circuit 7 in its original order of the video data which was shuffled at the time of recording for increasing efficiency of compression by averaging the video data in each frame. The deshuffled data is then output as the reproducing signal.

A memory may also be required for a deshuffling process because video data having time lag cannot be reassembled in real time. The control circuit 12 therefore controls the writing and reading of the data to and from the second frame memory 10 for deshuffling data.

When the detecting circuit 11 detects a chronologically discontinued portion in the recording, it outputs the detection signal to the control circuit 12. The control circuit 12 then instructs the deshuffling circuit 108, which writes and reads data to and from the second frame memory 10, to stop writing data to the second frame memory 10 and repeat reading out already written data for a specified time.

Figure 2:
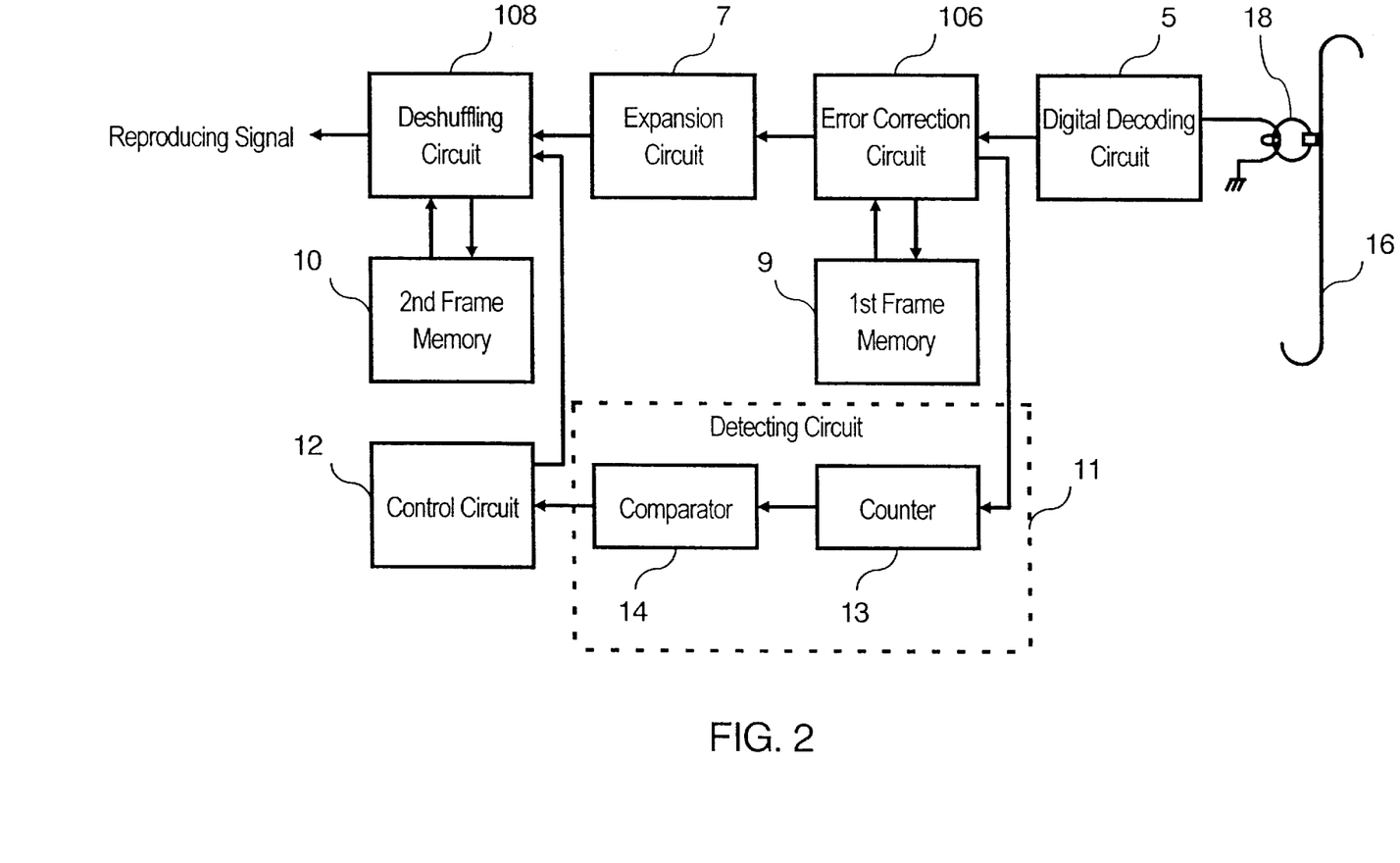
FIG. 2 is a block diagram illustrating details of a detecting circuit in a reproduction system of a digital recording and playback unit in accordance with a first and second exemplary embodiments of the present invention.

FIG. 2 shows components of the detecting circuit 11. The detecting circuit 11 comprises a counter 13 and a comparator 14. The counter 13 counts erroneous data based on error correction information received from the error correction circuit 106. The comparator 14 compares the output of the counter 13 with a specified value, and outputs the result to the control circuit 12.

Digital VCRs desirably execute an equalization process (not illustrated) between the playback head 18 and the digital decoding circuit 5 for correcting fluctuations in phase characteristics or frequency characteristics in the electromagnetic conversion system for the waveform of the reproduced signal. In general, error correction information in playback data is used for equalization. In other words, the waveform of the playback signal is corrected to reduce erroneous data based on error correction information from the error correction circuit 106 during the equalization process.

The detecting circuit 11 detects a chronologically discontinued portion in the recording using the same error correction information. As shown in FIGS. 9A and 9B of a recording track pattern, a part of the last track of the previous recording is taken away by the new recording track, resulting in narrowed recording track, when assemble recording takes place in a narrow track width. The amplitude of the original signal of the playback data is greatly reduced in this narrowed track, and the possibility of occurrence of errors in decoded data increases. The counter 13 counts erroneous data, and the comparator 14 compares the counted number of errors with a preset value. When the counted number of errors exceeds the preset value, the control circuit 12 determines that assemble recording is being conducted in narrow track width.

The control circuit 12 then instructs the deshuffling circuit 108 to stop writing data to the second frame memory 10 and repeat reading out already written data for a specified time.

A chronologically discontinued recorded portion can be detected in still other ways than by the use of error correction information. Control data may be added to video data during recording and the recorded control data, which differs from video data, is detectable on playback. For example, in the DV format, control data other than video data such as audio AUX in the audio region, video AUX in the video region, and system data in the subcode region is recordable. The pack structure of the system data allows the use of different recording data packs for each region.

An optional pack which can be freely designated by manufacturers is also provided in the DV format. These system data can also be used for determining a chronologically discontinued portion during recording. Recording of recording date in year, month, and day, and recording time in hours, minutes, and seconds to the system data of audio AUX, video AUX, and subcode are semi-obligatory requirements in the DV format. The ID signal specified by the DV format can also be recorded in the subcode region. Original ID code can also be recorded on the option pack which can be designated by each manufacturer. Since recording date or recording time is not successive in assemble recording, a chronologically discontinued portion in the recording can be detected by checking the system data on playback.

In another example, if the ID signal is recorded for a certain period as the system data at the starting of a new recording, a chronologically discontinued portion in recording can also be detected by checking that ID signal at the time of playback.

Second exemplary embodiment

Figure 1B:
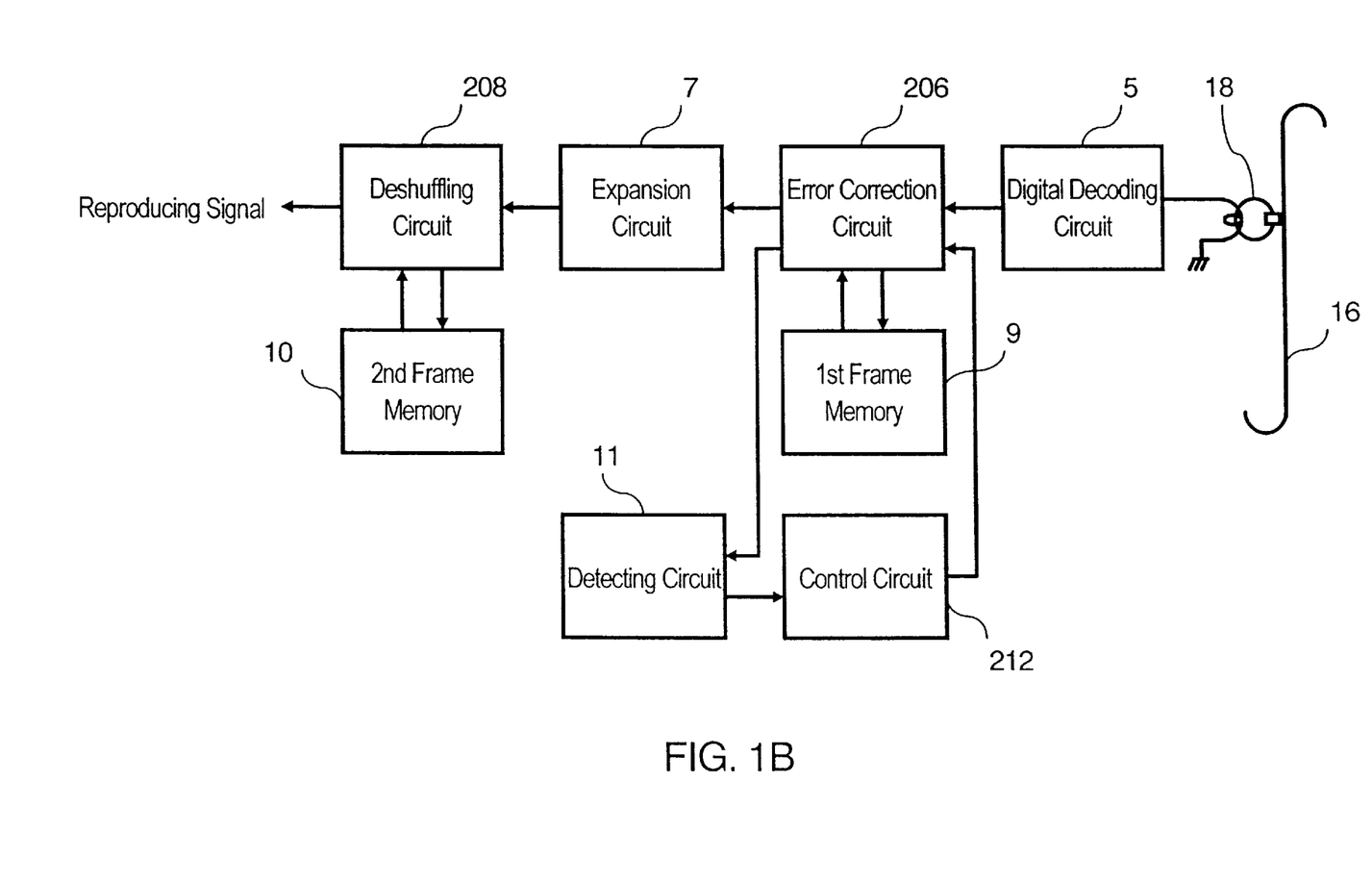
FIG. 1B is a block diagram of a reproduction system of a digital recording and playback unit in accordance with a second exemplary embodiment of the present invention.

FIG. 1B is a block diagram of a reproduction system of a digital recording and playback unit in a second exemplary embodiment of the present invention.

In FIG. 1A, the control circuit 12 instructs writing and reading to and from the second frame memory 10. In FIG. 1B, however a control circuit 212 instructs reading and writing to and from the first frame memory 9. If time permits from the detection of a chronologically discontinued recorded portion to the control of the frame memory, the same effect as the first exemplary embodiment 1 can be achieved by controlling reading and writing to and from the first frame memory 9.

The detecting circuit 11 in the second exemplary embodiment comprises the same components as that of the first exemplary embodiment which are shown in the broken line in FIG. 2.

Third exemplary embodiment

Figure 3:
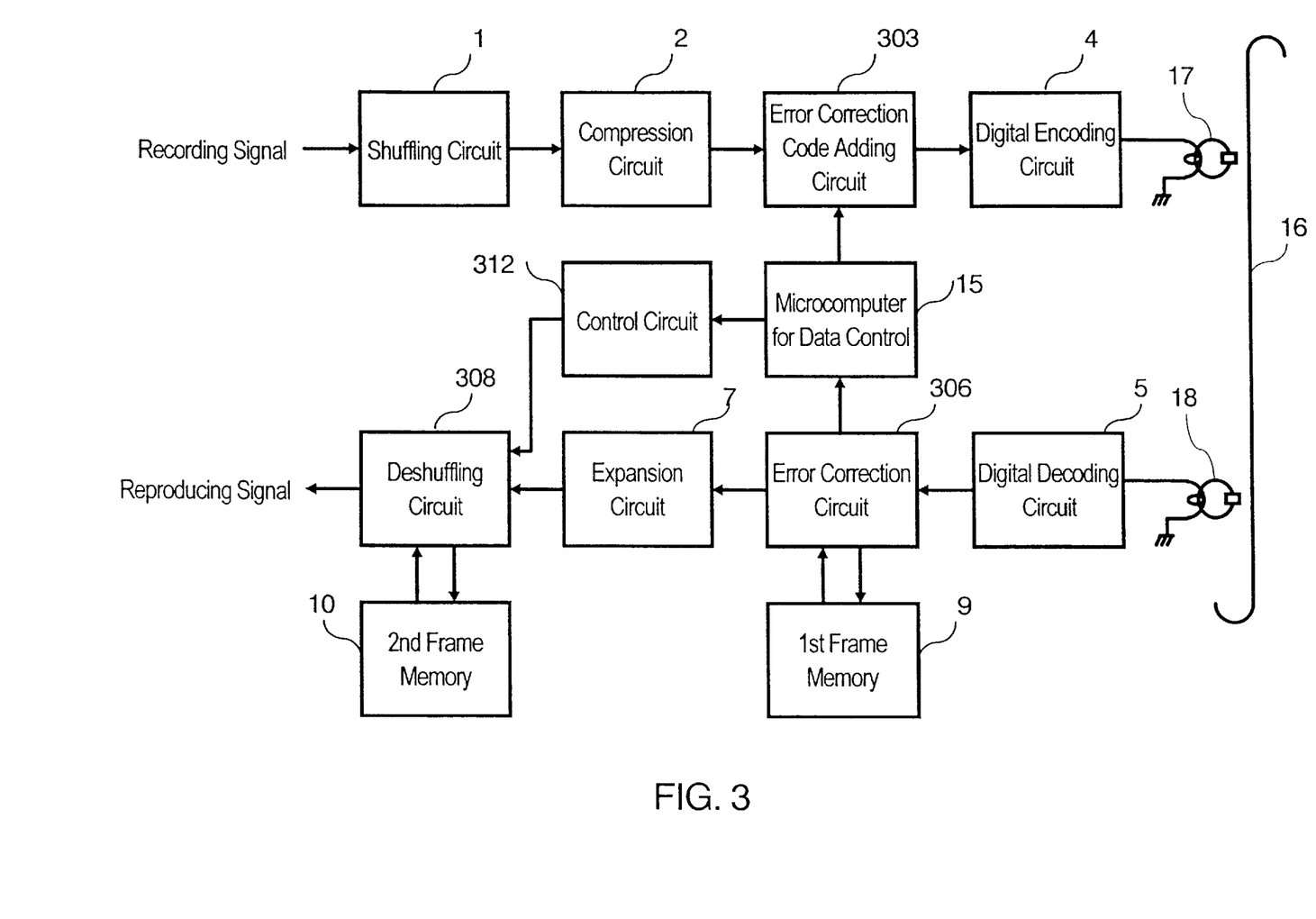
FIG. 3 is a block diagram of a reproduction system of a digital recording and playback unit in accordance with a third exemplary embodiment of the present invention.

FIG. 3 is a block diagram of a third exemplary embodiment of the present invention which employs system data for determining a chronologically discontinued portion during recording as explained at the end of the first exemplary embodiment.

A microcomputer for data control 15 sends the recording date (year, month, and day), recording time (hour, minute, and second), or ID signal to an error correction code adding circuit 303 during recording as system data to be recorded as video data. The error correction code adding circuit 303 adds an error correction code and system data to video data, and then a digital encoder 4 encodes and records this video data. On playback, errors in reproduced data decoded by a digital decoding circuit 5 are corrected by the error correction circuit 306, and the microcomputer for data control 15 receives system data for detecting a chronologically discontinued portion in the recording. The joint portion is determined by detecting changes in recording date, discontinuity in recording time, or presence of the ID signal as explained previously. The same effect as the first exemplary embodiment can be achieved by having the control circuit 312 stop the deshuffling circuit 308 from writing data to the second frame memory 10 and making the deshuffling circuit 308 repeat reading the already written data for a specified time when a joint portion is detected. Components in FIG. 3 which are not explained here have the same function as those in FIG. 5 of the prior art, and FIGS. 1A, 1B, and 2 of the present invention. Explanation is thus omitted by giving the same reference numerals.

Figure 4:
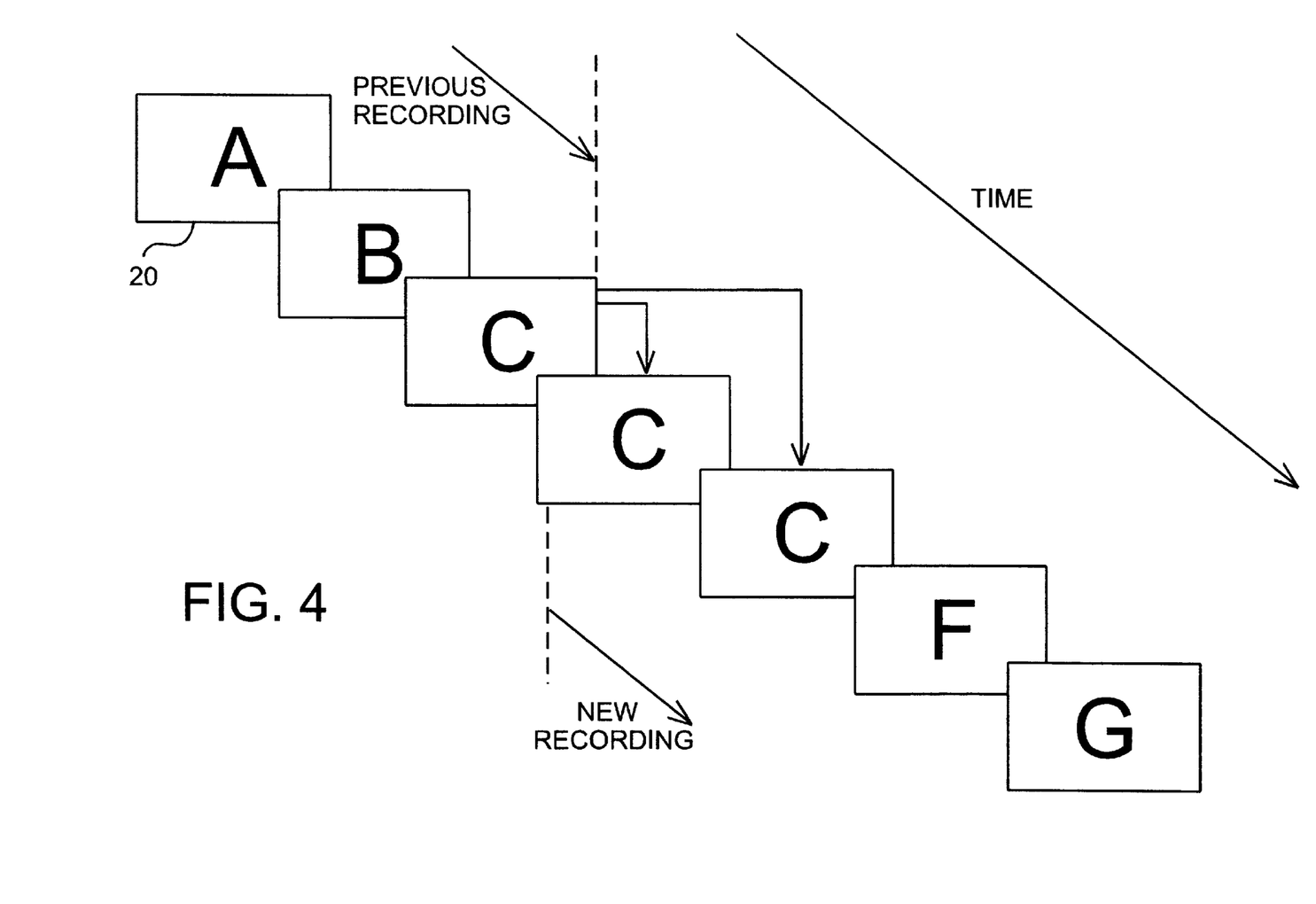
FIG. 4 is an example of reproduced video image of a digital recording and playback unit in accordance with the present invention.

FIG. 4 shows a video image of a joint portion in assemble recording with narrow track played back in the normal mode using a digital recording and playback unit of the present invention. As in FIG. 10, a frame image 20 which is reproduced and displayed is renewed in the sequence of A, B, C, D, E, F, and G as time passes. Although the effect of deviation in ATF control occurs at the joint portion, the video image of the old recording is retained and output for several frames instead of new frames recorded immediately after starting assemble recording.

In the example in FIG. 4, a frame image C is displayed if a correct video image of frame images D and E cannot be displayed due to errors in the data to avoid displaying the distorted image.

With the present invention, a joint portion is detectable on playback in the normal mode, and therefore video quality can be maintained without displaying unrestorable distorted video images by keeping data in the frame memory of the reproduction process displayed when a part of the playback data is unrestorable due to deviation in ATF control occurring in a chronologically discontinued portion. The present invention offers a simple structure and inexpensive digital recording and playback unit for long recording hours employing a common head without making the structure excessively complicated by providing a head exclusively for standard-track and narrow-track recording and playback.

In the DV format, a semiconductor memory is provided in the cassette itself in addition to audio AUX, video AUX, and subcode. The same system data is thus recordable to the cassette memory which makes it possible to determine the joint portion in advance without being dependent on the playback signal from the head. This enables quicker response.

The first and second exemplary embodiments refer to a detecting circuit for detecting a chronologically discontinued portion in the recording based on error correction information from an error correction circuit and a control circuit for controlling writing and reading to and from a frame memory, and the third exemplary embodiment refers to a microcomputer for data control which operates as a detecting circuit. Each function is explained separately; however, all functions may also be handled by the microcomputer for data control 15.

The preferred embodiments described herein are therefore illustrative and not restrictive, the scope of the invention being indicated by the appended claims and all variations which come within the meaning of the claims are intended to be embraced therein.

What is claimed is:

1. A digital recording and playback unit employing helical scanning, which records video image data using a recording and playback head with a width W in a track width narrower than 2 W/3 and forms one frame of video image data with multiple tracks, comprising:

decoding means for decoding a playback signal reproduced from said playback head and providing decoded digital playback data;

error correction means for restoring data by correcting erroneous portions of the decoded digital playback data and providing restored data;

a first frame memory operable with said error correction means;

deshuffling means for deshuffling the restored data and providing deshuffled data;

a second frame memory operable with said deshuffling means;

detection means for detecting a chronologically discontinued portion in the recording of the video image data at the time of playback and for providing an output responsive thereto; and control means for controlling one of a) reading and writing data between said first frame memory and said error correction means, and b) reading and writing data between said second frame memory and said deshuffling means, based on the output from said detection means.

2. A digital recording and playback unit as defined in claim 1, further comprising expansion means for expanding the restored data and outputting expanded data to said deshuffling means.

3. A digital recording and playback unit as defined in claim 1, wherein said detection means comprises:
   a counter for counting erroneous data based on error correction information received from said error correction means for restoring said decoded data; and
   a comparator for comparing the output of said counter with a predetermined value.

4. A digital recording and playback unit as defined in claim 2, wherein said detection means comprises:
   a counter for counting erroneous data based on error correction information received from said error correction means for restoring said decoded data; and
   a comparator for comparing the output of said counter with a predetermined value.

5. A digital recording and playback unit as defined in claim 3, wherein said comparator compares only the output for the last track of multiple tracks forming one frame.

6. A digital recording and playback unit as defined in claim 4, wherein said comparator compares only the output for the last track of multiple tracks forming one frame.

7. A digital recording and playback unit as defined in claim 1, wherein said control means is operable to stop writing to said second frame memory and repeat reading out data written to said second frame memory before errors in the decoded data exceed a specified value.

8. A digital recording and playback unit as defined in claim 2, wherein said control means is operable to stop writing to said second frame memory and repeat reading out data written to said second frame memory before errors in the decoded digital playback data exceed a specified value.

9. A digital recording and playback unit as defined in claim 1, wherein said control means is operable to stop writing to said first frame memory and repeat reading out data written to said first frame memory before errors in the decoded digital playback data exceed a specified value.

10. A digital recording and playback unit as defined in claim 2, wherein said control means is operable to stop writing to said first frame memory and repeat reading out data written to said first frame memory before errors in the decoded digital playback data exceed a specified value.

11. A digital recording and playback unit as defined in claim 1, wherein said detection means records control data other than video data during recording and determines a chronologically discontinued portion in the recording by detecting said control data, recorded other than video data, at the time of playback.

12. A digital recording and playback unit as defined in claim 2, wherein said detection means records control data other than video data during recording and determines a chronologically discontinued portion in the recording by detecting said control data, recorded other than video data, at the time of playback.

13. A digital recording and playback unit as defined in claim 11, wherein said control data other than video data is one of recording date, and recording hour, minute and second.

14. A digital recording and playback unit as defined in claim 12, wherein said control data other than video data is one of recording date, and recording hour, minute and second.

15. A digital recording and playback unit as defined in claim 11, wherein said control data other than video data is a recording start control signal recorded at a starting recording time that can be detected at playback.

16. A digital recording and playback unit as defined in claim 12, wherein said control data other than video data is a recording start control signal recorded at a starting recording time that can be detected at playback.

17. A digital recording and playback unit employing helical scanning, which records video image data using a recording and playback head having a width W in a track width narrower than 2 W/3 and forms one frame of video image data with multiple tracks, said unit comprising:
   decoding means for decoding data reproduced from a recording medium and providing decoded digital playback data;
   error correction means for restoring data by correcting erroneous portions of said decoded digital playback data;
   first frame memory for receiving said decoded digital playback data from said error correction means and temporarily storing restored decoded digital playback data;
   an expansion circuit for receiving and expanding said restored decoded digital playback data to reconstitute an original video data;
   detection means for receiving said restored decoded digital playback data and detecting a chronologically discontinued portion of said restored decoded digital playback data;
   deshuffling means for reassembling said original video data into an original order and outputting said original video data as a reproduced signal;
   second frame memory for temporarily storing said original video data received from said deshuffling means; and
   control means for controlling writing data to and reading data from said first frame memory or said second frame memory based on an output from said detection means.

18. A digital recording and playback unit as defined in claim 17, wherein said detection means comprises:
   a counter for counting erroneous data based on error correction information received from said error correction means for restoring said decoded data; and
   a comparator for comparing the output of said counter with a predetermined value.

* * * * *